July 8, 1941.  E. H. HULL  2,248,629
MACHINE AND SUPPORTING ARRANGEMENT THEREFOR
Filed Nov. 29, 1939   3 Sheets-Sheet 1
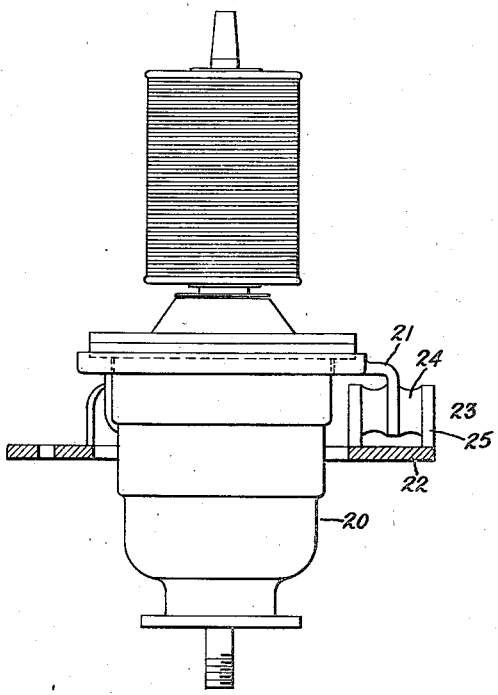
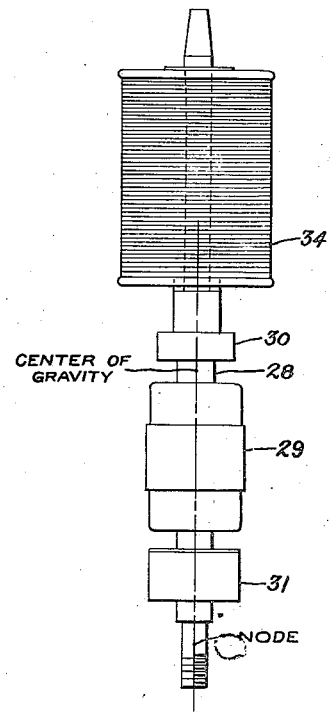
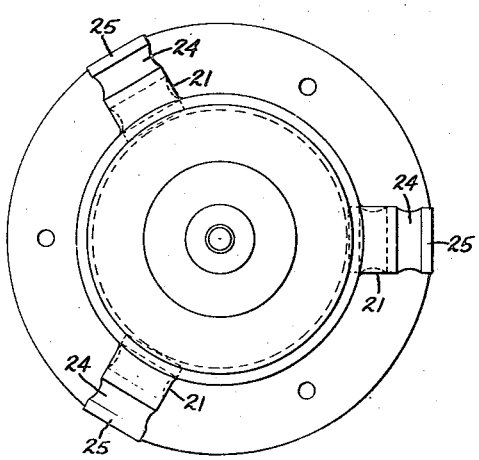
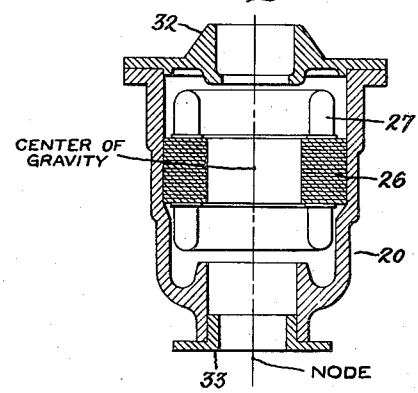
Inventor:
Edwin H. Hull,
by Harry E. Dunham
His Attorney.

Inventor:
Edwin H. Hull,
by Harry C. Dunham
His Attorney.

July 8, 1941.  E. H. HULL  2,248,629
MACHINE AND SUPPORTING ARRANGEMENT THEREFOR
Filed Nov. 29, 1939   3 Sheets-Sheet 3
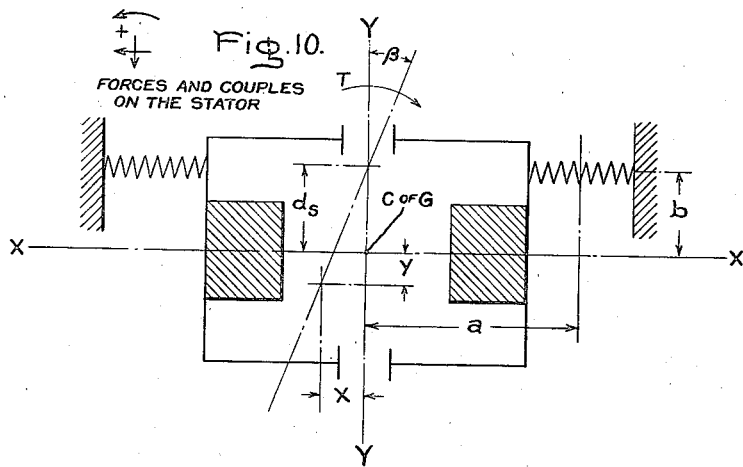
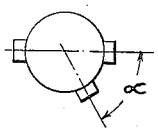
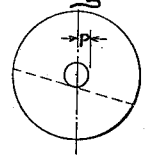
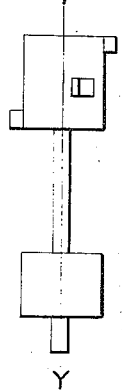
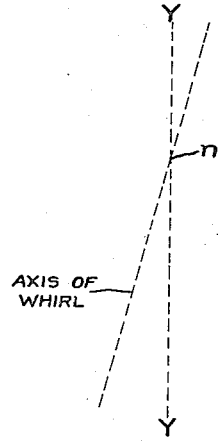
Inventor:
Edwin H. Hull,
by Harry E. Dunham
His Attorney.

Patented July 8, 1941

2,248,629

UNITED STATES PATENT OFFICE 2,248,629

MACHINE AND SUPPORTING ARRANGEMENT THEREFOR

Edwin H. Hull, Scotia, N. Y., assignor to General Electric Company, a corporation of New York Application November 29, 1939, Serial No. 306,711

10 Claims. (Cl. 248—26)

My invention relates to rotating machinery and to a supporting arrangement therefor, and more particularly to a method of designing the stationary member and mounting and to an arrangement for resiliently mounting the stationary member so that a minimum bearing pressure will occur at any given speed.

An object of my invention is to so construct a stationary member and mounting of a rotating machine that the bearing forces may be made a minimum for any given speed.

A further object of my invention is to provide a method of designing a rotating machine and a mounting therefor that a minimum of bearing forces will obtain for any given speed.

My invention will be more fully set forth in the following description referring to the accompanying drawings, and the features of novelty which characterize my invention will be pointed out in the claims annexed to and forming a part of this specification.

Figure 5:
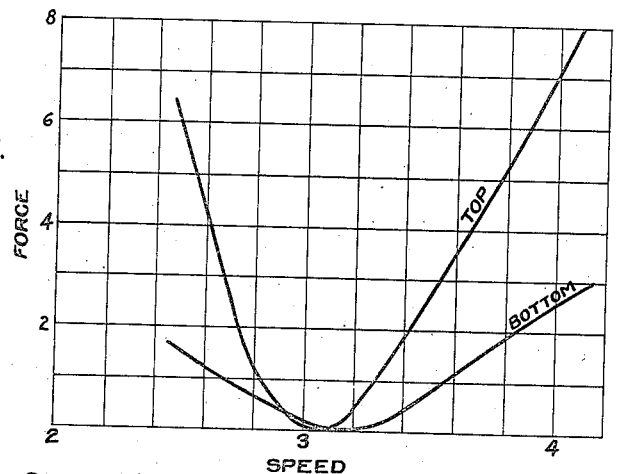

In the drawings, Fig. 1 is a side view of a vertical spring motor and mounting provided with an embodiment of my invention; Fig. 2 is a top view of the motor illustrated in Fig. 1; Fig. 3 is a side view of the rotatable part of the motor illustrated in Fig. 1; Fig. 4 is a sectional side elevation of the stationary member illustrated in Fig. 1; Fig. 5 is a graph representing relative bearing forces at the top and bottom bearings with changes of speed, above and below operating speed, and Figs. 6 to 14 are diagrams utilized to explain various features of my invention, and which will be referred to hereinafter.

Referring to the drawings, in Figs. 1 to 4 I have illustrated a dynamo-electric machine which has been constructed and mounted according to my invention so that the bearing forces are at a minimum for the speed at which this dynamo-electric machine has been designed to operate. The dynamo-electric machine illustrated has reference to a cotton spinning motor but it is, of course, to be understood that my invention may be applied to any dynamo-electric machine whether of the horizontal or vertical type, or in fact to any machine where there are bearings on the stationary member in which a journal may rotate. The motor illustrated includes a stationary member 20 having a bracket member 21 which is held on a base or supporting plate 22 through a resilient support 23. This resilient support 23 may be of any suitable type, such as a metal spring, rubber, or any resilient material, and in the illustrated embodiment of my invention the resilient support includes a rubber block 24 which is attached to a supporting bracket 25 by any suitable means such as vulcanization, and which is also attached to the supported bracket 21. Three such supports are shown, but it is to be understood that any suitable number may be used, and some may be axially spaced from others, if desired, it being only necessary to obtain a minimum of bearing forces that their stiffness be substantially symmetrical about the longitudinal center axis so that the stationary member may be tuned to oscillate with the rotatable body which it supports. As shown more particularly in Fig. 4, the stationary member 20 also has a core member 26 in suitable slots of which a coil member 27 is placed. Adapted to react electro-dynamically with this core member there is provided a rotatable member 28 having an armature 29 of any suitable type, such as the induction motor squirrel cage type. The rotatable member 28 has journal bearing members 30 and 31 which rotate in the top and bottom stationary bearing members 32 and 33 respectively. Two bearings are shown, but it is to be understood that any suitable number may be used. The rotatable member 28 also has a spinning bobbin 34 on which the cotton, or whatever material is to be spun, is placed.

It is, of course, well known that if a rotatable member is unbalanced, when it rotates undesirable bearing forces will occur. In vertical spinning motors of the above-mentioned type where a bobbin is placed on the rotatable member it will usually be found that the rotatable member has an unbalance. My invention overcomes this difficulty by providing for minimum bearing forces in spite of the fact that the rotatable member is unbalanced. This is accomplished by so designing the stationary member with structural constants such that it may oscillate at a natural frequency substantially equal to the frequency of oscillation of the rotor at the normal rotor speed in such a manner that its node will coincide substantially with the node that the rotor would have if it were rotating freely in space. As will be more completely described hereinafter through the medium of simple diagrams and equations, the designing of the stationary member includes so distributing its mass and picking a resilient support which has a suitable resiliency, that a minimum of bearing forces will obtain. Damping is not essential but as a practical matter there will be some damping and this fact is advantageous in that it helps the machine to go through critical speeds with a minimum of disturbance. I have shown in Figs. 3 and 4 the relative arrangements of the centers of gravity and nodal points of both the rotatable and stationary members, but it is, of course, to be understood that there are many other relative arrangements of these particular points. Minimum bearing forces may then be obtained by the method of first finding out how the particular rotatable member would behave if it were to rotate freely in space, and then having determined its node, building a stationary member around it which will oscillate at a natural frequency equal to the normal operating speed range of the rotatable member in such a manner that the node of the stationary member will coincide with the node of the rotatable member as determined by the first step. Assuming a relatively rigid rotatable member its node will not vary with changes in speed.

My invention therefore provides for a minimum of bearing forces at any given speed and in the graph shown in Fig. 5 there is represented the relative changes of bearing forces at the top and bottom bearing for different speeds above and below operating speed. It will be noted that at a particular speed the bearing forces at both the top and bottom bearings are at a minimum and if that speed is increased or decreased the bearing forces rise.

*Application of general principles*

In order to more completely describe my invention reference will now be made to general mechanical principles and to their application to my invention and to the simple diagrams shown in Figs. 6 through 14.

Figure 6:
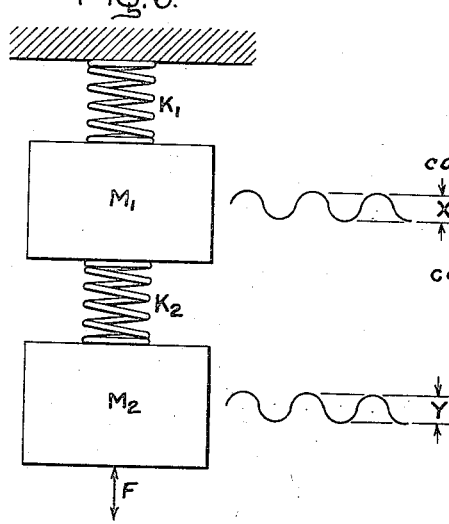

Let us first take a simple system of two masses $M_1$ and $M_2$, as shown in Fig. 6, $M_1$ being supported by a base member through the spring $k_1$ and $M_2$ being supported by $M_1$ through spring $k_2$. The sinusoidal force F acts on $M_2$. The equations of motion of $M_1$ and $M_2$ may be written from the standard mechanical impedance expression $$\text{Half amplitude} = \frac{\text{Maximum value of applied sinusoidal force}}{\text{Mechanical impedance}} \quad (1)$$

Using the following symbols:

$x, y$=Half amplitudes of masses $M_1$ and $M_2$ respectively.
F=Maximum value of applied sinusoidal force.
Z=Mechanical impedance.
$\omega$=Angular frequency.
$k_1, k_2$=Elastic constants of springs.

From (1)

$$y = \frac{F(k_1 + k_2 - M_1\omega^2)}{k_2 k_1 - \omega^2(k_2 M_1 + k_1 M_2 + k_2 M_2) + M_1 M_2 \omega^4} \quad (2)$$

and from (1) and (2)

$$x = \frac{F k_2}{k_2 k_1 - \omega^2(k_2 M_1 + k_1 M_2 + k_2 M_2) + M_1 M_2 \omega^4} \quad (3)$$

In order to find out under what conditions $x$ and $y$ may be made equal, let us equate (2) and (3), from which we obtain $$\omega = \pm \sqrt{\frac{k_1}{M_1}} \quad (4)$$

It should be noted that this effect does not depend upon the value of $k_2$ and that this speed is the natural frequency of $M_1$ on $k_1$ alone which should not be confused with either one of the two natural frequencies of the system. Since the two ends of the spring $k_2$ are subjected to the same amplitude in the same phase then no force is transmitted through $k_2$ after the system has reached a steady state.

Figure 7:
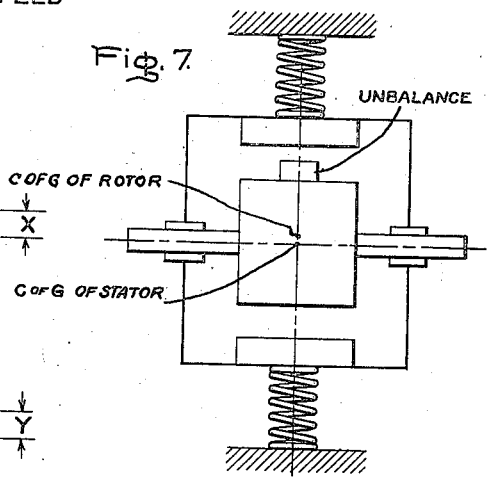

The analogy between the system of Fig. 6 and the statically unbalanced motor as shown in Fig. 7 is evident. Since the theoretical point of no bearing pressure does not depend on $k_2$ (Fig. 6), $k_2$ may be kept rigid. Then in Fig. 7 the rotor is $M_2$, the stiffness of the shaft and bearings $k_2$, the stator $M_1$ and the mounting springs $k_1$. The sinusoidal force F is replaced by a mechanical unbalance force on the rotor. Because of symmetry, all motions will be in translation only and no bearing pressure will be experienced when the natural frequency of the stator alone on its elastic mounting is made equal to the running speed of the rotor.

Figure 8:
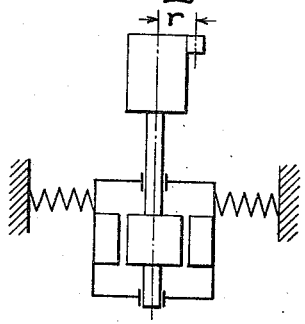
Figure 9:
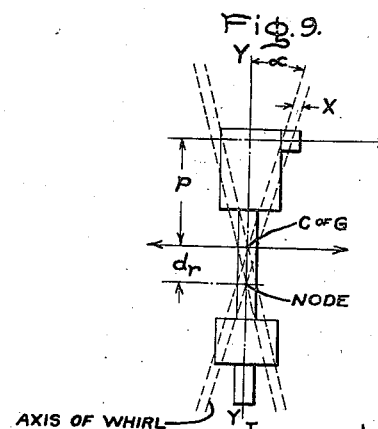

Figs. 8, 9 and 10 show this above analysis applied to a more general case of a motor of the spinning spindle type mounting a statically unbalanced bobbin on its shaft extension. It has been found by experience that this type of motor and load is much more sensitive to unbalance at the top of the bobbin than at the bottom, hence this case is analyzed for a load in that position using the following symbols:

$m$=Mass causing unbalance.
$r$=Radius of unbalance.
$\omega$=Angular frequency of rotor.
$p$=Distance from unbalance to rotor C. of G.
$I_r, I_s$=Moment of inertia of the rotor and stator systems respectively about an axis through their C. of G. and perpendicular to the shaft axis.
$\alpha$=Angle between axis of whirl and $y$—$y$ axis.
$x, y$=Displacement of the C. of G. of rotor or stator.
$M_r, M_s$=Mass of rotor and stator respectively.
$d_r$=Distance from C. of G. of rotor to node.
T=Applied torque.
$\beta$=Inclination of axis due to torque T.
$a$=Distance along $x$—$x$ axis from $y$—$y$ axis to spring center.
$k_x, k_y$=Elastic constants in directions indicated.
$b$=Distance along $y$—$y$ axis from C. of G. of stator to spring center.
D=Denominator of Equation (11).
$d_s$=Distance from C. of G. of stator to node.
$\omega_c$=Natural frequencies of stator.

Fig. 8 shows the rotor mounted in the stator but in order to determine the mode of vibration of the unrestricted rotor system let us consider it separately from the stator as it is shown in Fig. 9. The unbalanced force $mr\omega^2$ is transferred from a single force to an equal force at the center of gravity and a couple $mr\omega^2 p$. The angular amplitude of the rotor system will be given by:

$$\alpha = \frac{mr\omega^2 p}{-I_r \omega^2} \quad (5)$$

Translation of the center of gravity by the force $mr^2$ will be given by:

$$x = \frac{mr\omega^2}{-M_r \omega^2} \quad (6)$$

Since the phase relation of these two displacements is always the same regardless of frequency they may be superimposed giving a node at the distance $d_r$ from the center of gravity, from the expression $$\alpha = \frac{x}{d_r} \quad (7)$$

or, $$d_r = \frac{x}{\alpha} = \frac{I_r}{p M_r} \quad (8)$$

The position of this nodal point does not depend on the amount of unbalance or angular frequency.

Having determined the nodal point of the rotor it now remains to design an elastic mounting which will allow the stator to oscillate at a natural frequency of value $\omega_c$, equal to the rotor speed in such a manner that its node will coincide with the rotor system node.

Fig. 10 shows the displacement of the stator under a torque only which is sufficient to determine its mode of vibration at a natural frequency. The equations of motion are:

$$\Sigma T, \quad -T - I_s\omega^2\beta + 2a^2\beta k_y - 2k_x b_x + 2k_x b^2 \beta = 0 \quad (9)$$

$$\Sigma F, \quad +M_s x\omega^2 - 2k_x x + 2k_x b\beta = 0 \quad (10)$$

The angular amplitude of the axis due to the torque T may therefore be determined from these equations and the equation will be as follows:

$$\beta = \frac{T(2k_x - M_s\omega^2)}{D} \quad (11)$$

where $$D = I_s M_s \omega^4 - \omega^2(2k_x I_s + 2a^2 k_y M_s + 2k_x b^2 M_s) + 4k_x k_y a^2$$

solving (10) for $x$ and combining with (11) gives $$x = \frac{2k_x bT}{D} \quad (12)$$

Combining (11) and (12) gives the position of the stator node in terms of distance from the C. of G.

$$d_s = \frac{x}{\beta} = \frac{2k_x b}{2k_x - M_s\omega^2} \quad (13)$$

The natural frequencies of the stator system in the plane shown will occur when the denominator of Equation 11 becomes zero. Therefore, $$\omega_c = \pm\sqrt{\frac{k_x}{M_s} + \frac{a^2 k_y + b^2 k_x}{I_s} \pm \sqrt{\left(\frac{k_x}{M_s} + \frac{a^2 k_y + b^2 k_x}{I_s}\right)^2 - \frac{4a^2 k_x k_y}{I_s M_s}}} \quad (14)$$

Expression (14) gives two values for the natural frequency of the stator.

From the analysis of the rotor the desired position of the stator nodal point may be obtained giving the value $d_s$. Expression (13) will then give a value for one of the structural constants or quantities $k_x$, $b$, or $M_s$ having assumed the other two and knowing the rotor speed, $\omega$. These values together with the assumed value for $a$ and $k_y$ are substituted in Equation 14 to determine the natural frequencies of the system $\omega_c$, neither one of which will correspond with the rotor speed except by coincidence. Assumptions are varied, until by trial, a set of values is obtained which satisfies all conditions. It may be seen, therefore, that given a stator, it may be made to oscillate with a natural frequency $\omega_c$, by suitably supporting the stator on supports which have certain constants. However, as a practical matter it may be more desirable to so distribute the stator mass, $M_s$, that a support can be used which has a particular range of constants: $k_x$, $k_y$, $b$ and $a$.

Figs. 11 through 14 illustrate graphically a rotor containing an unbalance of the general type, that is, one which can be resolved into a couple and a single weight not in the same plane. The motion of the rotor due to the single weight alone will be determined from an analysis as of Figs. 8 through 10. That is, the geometrical rotor axis will whirl about an axis $y$—$y$ intersecting it at the nodal point. The rotor motion due to the couple alone will be a similar whirling axis intersecting the $y$—$y$ axis at the center of gravity of the axis of the rotor. There will be two differences between these axes of whirl; their nodal points will not occur at the same point on the axis of revolution and the vertical planes drawn through each will be separated by the angle $\alpha$.

When the separate motions due to the static and couple unbalances are superimposed an axis of whirl will be obtained which will not intersect the axis $y$—$y$. Hence no true nodal point will be formed in the rotor system. The point $n$ of nearest approach to the whirling axis is at a distance $\rho$ from the $y$—$y$ axis.

Since it is not possible, without the use of external forces, to design a stator system having a mode of vibration at a natural frequency corresponding to the rotor axis of whirl in this last mentioned case, a bearing pressure of substantially zero cannot be obtained. A minimum bearing pressure can be obtained, however, by proportioning the stator system to have a nodal point at a position corresponding to the point, $n$, of the rotor system. Point, $n$, is the center of a circle described by the path of movement of that point on the axis of rotation of the rotor which would have the least movement if the rotor were rotating freely in space. This is accomplished by the method described in connection with Figs. 8 through 10. As mentioned above, rotors with loads for the type indicated in Figs. 11 through 14 are most sensitive to unbalance at the top of the rotor so that the general type of unbalance can be closely approximated by a single weight at the top of the rotor load. It may, therefore, be seen from this fact that following the procedure outlined in connection with Figs. 8 through 10 the bearing loads may be made to be relatively small or at a minimum for the general case of unbalance outlined in Figs. 11 through 14.

Although my invention has been described in its application to a statically unbalanced rotatable body, it is to be understood that it has application to a body which is dynamically unbalanced, or to any other type of unbalanced body which is supported by a relatively stationary member where the stationary member may be tuned to oscillate with the rotatable body.

Modifications of the particular arrangements which I have disclosed embodying my invention will occur to those skilled in the art, so that I do not desire my invention to be limited to the particular arrangement set forth and I intend in the appended claims to cover all modifications which do not depart from the spirit and scope of my invention.

What I claim as new and desire to secure by Letters Patent of the United States is:

1. A supporting arrangement for a rotatable member including a stationary member having a resilient supporting means adapted to allow said stationary member to vibrate and a bearing in which said rotatable member may rotate, said rotatable member tending to oscillate when unbalanced, the structural constants of said stationary member being such as to determine a natural frequency of oscillation of said stationary member substantially equal to the frequency of oscillation of said rotatable member at the normal operating speed range of rotation of said rotatable member in order to minimize bearing forces due to said oscillations.

2. A supporting arrangement for a rotatable member including a stationary member having a resilient supporting means adapted to allow said stationary member to vibrate and a bearing in which said rotatable member may rotate, said rotatable member tending to oscillate when unbalanced substantially about a nodal point when rotating freely in space, the structural constants of said stationary member being such as to determine a node thereof in substantial coincidence with said node of said rotatable member in order to minimize bearing forces.

3. A supporting arrangement for a rotatable member including a stationary member having a resilient supporting means adapted to allow said stationary member to vibrate and a bearing in which said rotatable member may rotate, said rotatable member tending to oscillate when unbalanced substantially about a nodal point when rotating freely in space, the structural constants of said stationary member being such as to determine a natural frequency of oscillation of said stationary member substantially equal to the frequency of oscillation of said rotatable member at the normal operating speed of rotation of said rotatable member and a node of said stationary member in substantial coincidence with said node of said rotatable member in order to minimize bearing forces.

4. A supporting arrangement for a rotatable member including a stationary member having a resilient supporting means adapted to allow said stationary member to vibrate and a bearing in which said rotatable member may rotate, said rotatable member being adapted to operate when balanced and unbalanced and tending to oscillate when unbalanced upon rotating freely in space, the structural constants of said stationary member being such as to determine a node of said stationary member in substantial coincidence with the center of a circle described by the path of movement of that point having the least movement on the axis of rotation of said rotatable member during said oscillations thereof in order to minimize bearing forces.

5. A supporting arrangement for a rotatable member including a stationary member having a resilient supporting means adapted to allow said stationary member to vibrate and a bearing in which said rotatable member may rotate, said rotatable member being adapted to operate when balanced and unbalanced and tending to oscillate when unbalanced upon rotating freely in space, the structural constants of said stationary member being such as to determine a natural frequency of vibration of said stationary member substantially equal to the frequency of oscillation of said rotatable member at the speed of rotation of said rotatable member and to determine a node of said stationary member in substantial coincidence with the center of a circle described by the path of movement of that point having the least movement on the axis of rotation of said rotatable member during said oscillations thereof in order to minimize bearing forces.

6. The method of making a support for a statically unbalanced rotatable body so as to obtain a minimum of bearing forces which includes determining the frequency of oscillation of the rotatable body at the normal operating speed of the rotatable body and designing a stationary member with a resilient support in which said rotatable body may rotate so that the natural frequency of oscillation of the stationary member is substantially equal to the frequency of oscillation of the rotatable body at the normal operating speed of the rotatable body.

7. The method of making a support for a statically unbalanced rotatable body so as to obtain a minimum of bearing forces which includes determining a node that the rotatable body would have rotating freely in space and designing a stationary member with a resilient support in which the rotatable body may rotate so that a node of the stationary member coincides substantially with the node of the rotatable body.

8. The method of making a support for a statically unbalanced rotatable body so as to obtain a minimum of bearing forces which includes determining the frequency of oscillation of the rotatable body at its normal operating speed and a node that the rotatable body would have rotating freely in space and designing a stationary member with a resilient support in which the rotatable body may rotate so that the natural frequency of oscillation of the stationary member is substantially equal to the frequency of oscillation of the rotatable body at the normal operating speed of the rotatable body and so that a node of the stationary member coincides substantially with the node of the rotatable body.

9. The method of making a support for an unbalanced rotatable body so as to obtain a minimum of bearing forces which includes determining the frequency of oscillation of the rotatable body at its normal running speed and the center of a circle described by the path of movement of that point having the least movement on the axis of rotation of the rotatable body considering the rotatable body rotating freely in space and designing a stationary member with a resilient support in which the rotatable body may rotate so that the natural frequency of oscillation of the stationary member is substantially equal to the frequency of oscillation of the rotatable body at the normal operating speed of the rotatable body and so that a node of the stationary member coincides substantially with the center of a circle described by that point on the axis of rotation of the rotatable body.

10. A supporting arrangement for a rotatable member including a stationary member having a resilient supporting means and a bearing in which said rotatable member may rotate, the structural constants of said stationary member being such that $$d_s = \frac{2k_x b}{2k_x - M_s \omega^2}$$

and $$\omega_c = \pm \sqrt{\frac{k_x}{M_s} + \frac{a^2 k_y + b^2 k_x}{I_s} \pm \sqrt{\left(\frac{k_x}{M_s} + \frac{a^2 k_y + b^2 k_x}{I_s}\right)^2 - \frac{4a^2 k_x k_y}{I_s M_s}}}$$

where, $\omega$ = Angular frequency of rotor.
$I_s$ = Moment of inertia of the stator system about an axis through the C. of G. and perpendicular to the shaft axis.
$M_s$ = Mass of stator.
$a$ = Distance along $x$—$x$ axis from $y$—$y$ axis to resilient support center.
$k_x$, $k_y$ = Elastic constants of resilient support along $x$ and $y$ axes respectively.
$b$ = Distance along $y$—$y$ axis from C. of G. of stator to resilient support center.
$d_s$ = Distance from C. of G. of stator to node of an unrestricted rotating rotor.
$\omega_c$ = Natural frequencies of stator when $\omega$ equals $\omega_c$.

EDWIN H. HULL.